United States Patent [19]

Dimitriou

[11] Patent Number: 5,226,355
[45] Date of Patent: Jul. 13, 1993

[54] BERRY STRIPPING MACHINE FOR GRAPES

[75] Inventor: Michael Dimitriou, Bretten, Fed. Rep. of Germany

[73] Assignee: AMOS GmbH Anlagentechnik, Heilbronn, Fed. Rep. of Germany

[21] Appl. No.: 922,233

[22] Filed: Jul. 31, 1992

[30] Foreign Application Priority Data

Aug. 22, 1991 [DE] Fed. Rep. of Germany ....... 4127761

[51] Int. Cl.⁵ ................... A23N 1/00; A23N 15/00; A23N 15/02
[52] U.S. Cl. ........................ 99/510; 99/513; 99/637; 99/638
[58] Field of Search .............. 99/495, 509–513, 99/635, 636, 637–639; 241/260.1; 100/117, 145; 366/224

[56] References Cited

U.S. PATENT DOCUMENTS

| | | | |
|---|---|---|---|
| 320,049 | 6/1885 | David | 99/639 |
| 358,241 | 2/1887 | Worth | 99/639 |
| 1,085,068 | 1/1914 | Swanson | 99/510 |
| 1,094,817 | 4/1914 | Rossi | 99/510 |
| 1,128,026 | 2/1915 | Meakin | 99/510 |
| 2,172,790 | 9/1939 | Ferrari et al. | 99/513 |
| 2,318,805 | 5/1943 | Silva | 99/639 |
| 2,374,456 | 4/1945 | Ravndal et al. | 99/510 |
| 2,543,571 | 2/1951 | Ferrari | 99/637 |
| 3,478,796 | 11/1969 | Rafanelli | 99/495 |
| 4,457,223 | 7/1984 | Spinato . | |
| 4,784,057 | 11/1988 | Mietzel | 99/638 |

FOREIGN PATENT DOCUMENTS

| | | |
|---|---|---|
| 289316 | 12/1915 | Fed. Rep. of Germany . |
| 2616630 | 12/1988 | France ................ 99/635 |
| 2630891 | 11/1989 | France . |
| 264315 | 11/1970 | U.S.S.R. .............. 99/510 |

Primary Examiner—Timothy F. Simone
Attorney, Agent, or Firm—Spencer, Frank & Schneider

[57] ABSTRACT

A berry stripping machine for grapes includes a machine housing, a berry stripping cylinder rotatably mounted therein, and a fill funnel for the grapes preceding the berry stripping cylinder. A spiked roller is coaxially mounted inside the berry stripping cylinder. The berry stripping cylinder and the spiked roller are driven by separate adjustable-rate drive units.

6 Claims, 2 Drawing Sheets

BERRY STRIPPING MACHINE FOR GRAPES

BACKGROUND OF THE INVENTION

The present invention relates to a berry stripping machine for grapes, and more particularly to a berry stripping machine of the type that includes a machine housing and an open ended berry stripping cylinder that is mounted in the machine housing so as to be rotatable about a horizontal axis, with one of the open ends of the berry stripping cylinder serving as an entrance opening for the grapes and with the other open end serving as an exit opening for the pedicels stripped from the berries. A berry stripping machine of this type may possibly also include crushing rollers that are disposed below and parallel to the berry stripping cylinder to receive berries leaving the berry stripping cylinder through its berry stripping openings, with the crushing roller being followed at the bottom by a housing opening. A berry stripping machine of this type further includes a spiked roller disposed within the berry stripping cylinder essentially concentric therewith and rotatably mounted in the machine housing. The berry stripping cylinder and the spiked roller may be driven to rotate in the same direction or in opposite directions at different speeds, so that spiked roller revolves faster than the berry stripping cylinder. Finally, a machine of this type includes a fill funnel for the grapes. The full funnel is open at the top and connected upstream of the intake opening of the berry stripping cylinder in the machine housing.

Such a berry stripping machine serves to separate the berries from the grape bunches, with the berries being freed from the pedicels and stems and with the pedicels leaving the machine without having any berries attached to them. In this connection, demands are increasingly made toward inflicting as little damage as possible to the berries. It is also very undesirable for the berries to still be attached to pieces of pedicels or stems.

In the prior art berry stripping machines, the berry stripping cylinder and the spiked roller have a common drive, with the drive connections being designed so that berry stripping cylinder and spiked roller operate at a constant speed ratio. The drive may here be regulated over a certain range. This is permits the throughput quantity of the machine to be adjusted to the availability of different quantities of grapes and/or grape species. It also permits grapes that are overripe or afflicted with botrytis to be treated more gently in the machine for example.

The drawback is that the control range is relatively limited, which means that the machine is not able to be controlled very far downward. The very low number of revolutions of the berry stripping cylinder that then results brings about the consequence that the berries will no longer be separated to a sufficient degree, so that pedicels which leave the machine carry too many berries.

Because of these limits in the reduction of velocity, the machine cannot be operated below capacity, that is, with small available quantities of grapes, since then the length of the berry stripping cylinder is no longer utilized fully. Rather, with below capacity operation, the berry stripping work may already be completed after passage through one third of the berry stripping cylinder, for example, so that only the bared pedicels are processed through the remaining two thirds of the machine. This results in a relatively large percentage of small pedicels or pedicel pieces among the berries, which is absolutely undesirable.

SUMMARY OF THE INVENTION

It is an object of the invention to substantially enlarge the control range of a berry stripping machine of the above mentioned type, particularly the downward range, so that small quantities of grapes can also be processed without disadvantageous consequences and/or particularly sensitive or diseased grapes can be processed in the gentle manner they require.

Based on a berry stripping machine of the above mentioned type, this is accomplished by the present invention in that the berry stripping cylinder and the spiked roller are each provided with an adjustable-rate drive unit, with at least one of the drive units preferably being infinitely adjustable in its number of revolutions.

With this measure according to the invention it is now possible to set the berry stripping cylinder to an appropriate speed, for example 1 m/sec, while the spiked roller is adjusted to a speed corresponding to the incoming quantity of grapes and/or the grape species. In this way it is possible to utilize the full length of the berry stripping cylinder, particularly for below capacity loads, that is, for small quantities of incoming grapes and/or different species of grapes, so that small pedicels or pieces of pedicels in the berries are avoided.

If certain grapes must be treated particularly gently, the speed of the berry stripping cylinder can be adjusted correspondingly, for example, to 0.5 to 0.7 m/sec. Such an adjustment does not the throughput quantity since the spiked roller can be set to a speed that is appropriate for the quantity of incoming grapes.

Compared to the prior art berry stripping machines, the invention requires greater expenditures due to the use of a second drive unit, but this is more than justified in view of the increased utility of the machine and the always attainable high quality of the berries.

BRIEF DESCRIPTION OF THE DRAWINGS

Further features and details of the invention will become evident from the description below of an embodiment thereof which is illustrated in the drawing, in which.

DETAILED DESCRIPTION OF THE PREFERRED EMBODIMENT

Figure 1B:
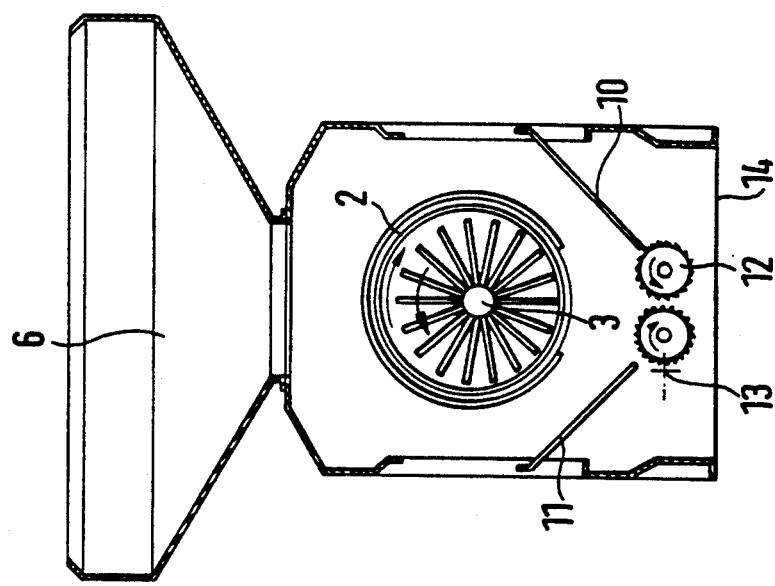
FIG. 1B is a front view, partially in section, of the prior art berry stripping machine shown in FIG. 1A.
Figure 1A:
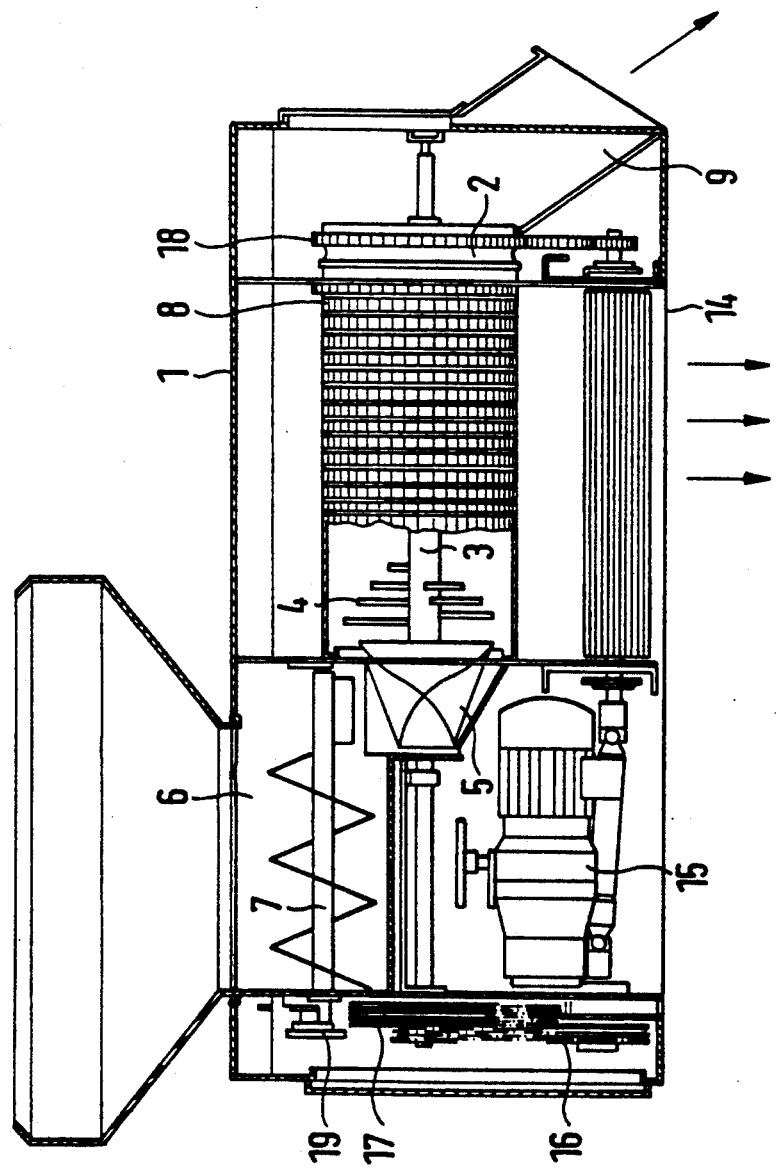
FIG. 1A is a side view, partially in section, of a prior art berry stripping machine.

The prior art machine according to FIGS. 1A and 1B includes a machine housing 1 in which a berry stripping cylinder 2 that is open at both its ends is rotatably mounted. A spiked roller 3 is rotatably mounted in berry stripping cylinder 2 in an essentially coaxial arrangement. The spikes 4 of the spiked roller are arranged in a helical curve on its circumference.

At its left end, spiked roller 3 is provided with an acceleration worm 5 which projects with a substantial portion of its length into the lower region of a fill funnel 6. Above the acceleration worm, fill funnel 6 includes a measuring worm 7, which measures out uniform quantities of grapes and feeds them from the left to the right to the acceleration worm 5 and thus to the interior of berry stripping cylinder 2. There the berries are stripped from the grape bunches with the aid of berry stripping openings 8 disposed along the circumference of the berry stripping cylinder, whereupon the stripped pedicels leave berry stripping cylinder 2 at the right end through its discharge opening in its end face and drop out of the machine housing 1 on a chute 9.

The berries drop down from berry stripping cylinder 2 and are guided by way of metal guide sheets 10 and 11 onto a pair of crushing rollers 12, where they are crushed or pressed to a greater or lesser degree. It is also possible, however, to not process the berries any further. In that case, the crushing rollers 12 can be moved apart by displacing the left crushing roller to the position marked by reference number 13. Then the berries leave the machine housing 1 through a lower housing opening 14.

As can be seen from the arrows drawn in the berry stripping cylinder in FIG. 1B, berry stripping cylinder 2 and spiked roller 3 move in opposite directions. For this purpose, they are driven by way of a motor 15 which is connected to a linkage mechanism 16 for the crushing rollers 12 and to a linkage mechanism 17 for spiked roller 3.

The linkage mechanism for crushing rollers 12 also drives berry stripping cylinder 8 in that the ends of crushing rollers 12 remote from motor 15 are rotationally connected with berry stripping cylinder 2 at 18.

Finally, it should be pointed out that motor 15 also provides the driving energy 19 for measuring worm 7.

As already mentioned above, in the prior art case, motor 15 can be regulated over a certain range. However, in view of the illustrated drive conditions, an adjustment of the drive always results in a simultaneous speed adjustment in the same sense of rotation for the berry stripping cylinder 2 and the spiked roller 3, so that it is not possible to provide for an appropriate adaptation to small quantities of incoming grapes or different grape qualities.

Figure 2:
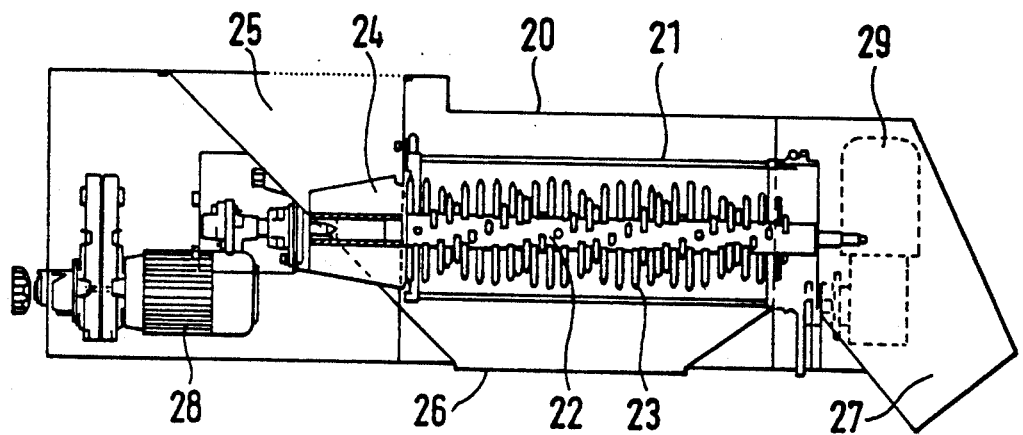
FIG. 2 is a sectional side view of the berry stripping machine according to the invention.
Figure 3:
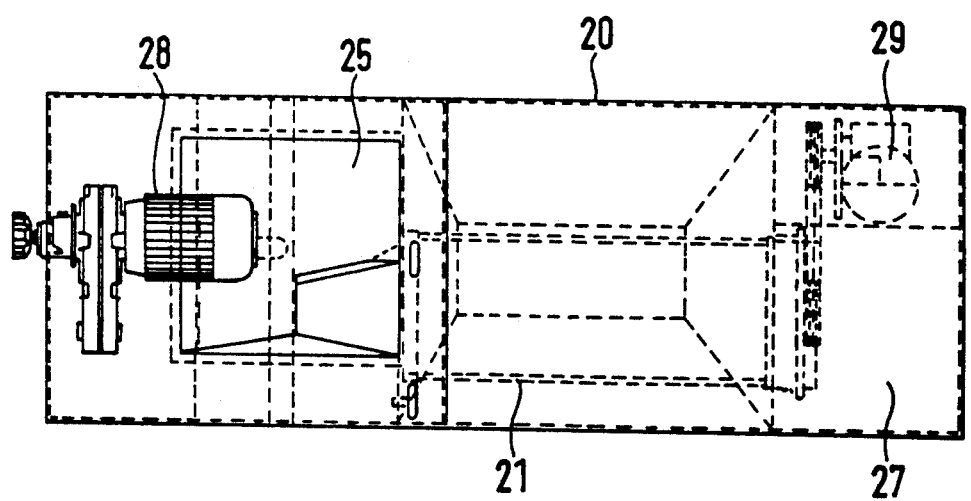
FIG. 3 is a top view of the machine of FIG. 2.

The berry stripping machine shown in FIGS. 2 and 3 serves to overcome this. Compared with the machine of FIGS. 1A and 1B, this machine also includes a machine housing 20, a berry stripping cylinder 21 mounted therein, a spiked roller 22 rotatable therein and equipped with helically arranged spikes 23, an acceleration worm 24 preceding the spiked roller, a fill funnel 25, a housing opening 26 and a chute 27.

Moreover, it can be seen that there is a controllable drive unit 28 for the spiked roller 22 and a likewise controllable drive unit 29 for the berry stripping cylinder 21. The controllability may be provided by the use of reversible-pole motors. Preferably, however, an infinitely variable control is provided. Thus it is possible,, in contrast to the prior art machine of FIGS. 1A and 1B, to separately set the rate of rotation of the berry stripping cylinder 21 on the one hand and the spiked roller 22 on the other hand, so that the most varied demands with respect to quantity and quality of grapes can be accommodated. In particular, the machine can be set to below capacity loads and small incoming quantities of grapes without the berry stripping efficiency suffering therefrom or too many pedicel pieces being included among the berries. On the other hand, particularly sensitive grapes can be stripped in since the speed of the berry stripping cylinder can be reduced without thus simultaneously also reducing the speed of the spiked roller.

For the sake of completeness it should also be mentioned that in the machine according to FIGS. 2 and 3 it is of course possible to provide crushing rollers underneath the berry stripping cylinder 21, with such crushing rollers being driven, if the construction shown in FIGS. 1A and 1B is employed, by the motor of drive unit 29 and berry stripping cylinder. Alternatively, the crushing rollers could be driven by the motor of drive unit 28.

It will be understood that the above description of the present invention is susceptible to various modifications, changes and adaptations, and the same are intended to be comprehended within the meaning and rang of equivalents of the appended claims.

What is claimed is:

1. An improved berry stripping machine for stripping grapes from pedicels, the berry stripping machine including a machine housing having an upwardly open fill funnel for receiving the grapes and pedicels and having a discharge opening, and a berry stripping cylinder having two open ends and having a periphery with berry stripping openings, the berry stripping cylinder being mounted in the machine housing above the discharge opening and being rotatable about a horizontal axis, with one of the open ends of the berry stripping cylinder serving as an entrance opening for the grapes and pedicels and with the other open end serving as an exit opening for the stripped pedicels, the berry stripping machine further including a spiked roller disposed within the machine housing so as to rotate essentially concentrically within the berry stripping cylinder, and means for rotating the berry stripping cylinder and the spike roller at different speeds, with the spiked roller rotating faster than the berry stripping cylinder, wherein the improvement comprises:

the means for rotating includes a first adjustable-rate drive unit means for rotating the berry stripping cylinder and a second adjustable-rate drive unit means for rotating the spiked roller.

2. A berry stripping machine according to claim 1 wherein the number of revolutions per minute of at least one of the first and second rive unit means is infinitely adjustable.

3. A berry stripping machine according to claim 1, further comprising crushing rollers between the berry stripping cylinder and the discharge opening, the crushing rollers being movable relative to one another between a crushing position and a non-crushing position, grapes which leave the berry stripping cylinder through its berry stripping openings being crushed by the crushing rollers before reaching the discharge opening when the crushing rollers are in their crushing position and passing between the crushing rollers to the discharge opening without being crushed when the crushing rollers are in their non-crushing position.

4. A berry stripping machine according to claim 1, wherein the first drive unit means rotates the berry stripping cylinder in a first direction and the second drive unit means rotates the spiked roller in a second direction, the second direction being opposite the first direction.

5. A berry stripping machine according to claim 1, wherein the first drive unit means comprises a first motor and the second drive unit means comprises a second motor.

6. A berry stripping machine according to claim 1, wherein the first drive unit means comprises a first motor which is mounted in the machine housing adjacent one end of the berry stripping cylinder and the second drive unit means comprises a second motor which is mounted in the machine housing adjacent the other end of the berry stripping cylinder.

* * * * *